United States Patent
Kornienko et al.

(10) Patent No.: US 11,244,431 B2
(45) Date of Patent: Feb. 8, 2022

(54) IMAGE PROCESSING (71) Applicant: Apical Limited, Cambridge (GB)

(72) Inventors: Alexey Kornienko, Cambridge (GB);
Vladimir Dolzhenko, Cambridge (GB);
Nerhun Yildiz, Cambridge (GB)

(73) Assignee: Apical Limited, Cambridge (GB)

( * ) Notice: Subject to any disclaimer, the term of this patent is extended or adjusted under 35 U.S.C. 154(b) by 0 days.

(21) Appl. No.: 16/657,103

(22) Filed: Oct. 18, 2019

(65) Prior Publication Data

US 2021/0118104 A1  Apr. 22, 2021

(51) Int. Cl.
*G06T 5/00* (2006.01)
*G06T 7/70* (2017.01)
*G06T 3/00* (2006.01)
*H04N 5/232* (2006.01)

(52) U.S. Cl.
CPC ............ *G06T 5/006* (2013.01); *G06T 3/0018* (2013.01); *G06T 7/70* (2017.01); *G06T 2207/10016* (2013.01); *H04N 5/23238* (2013.01)

(58) Field of Classification Search
None
See application file for complete search history.

(56) References Cited

U.S. PATENT DOCUMENTS

| | | | | |
|---|---|---|---|---|
| 2003/0123741 A1* | 7/2003 | Ueno | ..................... | G06T 1/60 382/239 |
| 2007/0025636 A1* | 2/2007 | Furukawa | ................. | G06T 1/60 382/275 |
| 2008/0100929 A1* | 5/2008 | Hara | ..................... | G06T 3/0018 359/725 |
| 2010/0111440 A1* | 5/2010 | Chai | ....................... | G06T 5/006 382/275 |
| 2013/0265468 A1* | 10/2013 | Morimura | .......... | H04N 5/23238 348/240.2 |
| 2014/0015853 A1* | 1/2014 | Ostrovsky | ............. | G06T 3/0093 345/619 |
| 2015/0262344 A1* | 9/2015 | Stec | ........................ | G06T 5/006 382/275 |
| 2018/0286012 A1* | 10/2018 | Dolzhenko | ........... | G06T 3/0056 |

FOREIGN PATENT DOCUMENTS

GB          2561170 A          10/2018

* cited by examiner

*Primary Examiner* — Vu Le
*Assistant Examiner* — Tracy Mangialaschi
(74) *Attorney, Agent, or Firm* — EIP US LLP (57) ABSTRACT

A method including streaming input image data representing an input frame of a video into temporary storage. Transformation data representing at least one transformation for application to the input image data is obtained. Ordering data indicating a variable order in which portions of output image data are to be generated is obtained, the ordering data being based on at least one characteristic of the input frame. The transformation data is used to identify portions of input image data to be processed to generate corresponding portions of output image data. The identified portions of input image data are processed to generate the corresponding portions of output image data in the order indicated by the ordering data.

18 Claims, 6 Drawing Sheets

IMAGE PROCESSING

BACKGROUND OF THE INVENTION

Field of the Invention

The present disclosure relates to methods and systems for processing image data, for example data representing an input frame of a video.

Description of the Related Technology

Certain lenses can be used to capture images or videos with a wide field or angle of view. For example, a fisheye lens is a wide-angle lens that can be used to capture wide panoramic or hemispherical images. Such lenses typically produce a distorted image, with certain parts of the image stretched or compressed compared with other parts. This generally leads to straight image features, such as a straight lines or edges, appearing curved rather than straight.

It is known to correct the distortion in an image captured by a fisheye lens to remove or reduce curvature of straight image features.

It is desirable to provide methods and systems for processing image data, for example to adjust a geometric distortion of an image represented by the image data, that allow higher throughput and/or provide greater efficiency than known methods and systems.

BRIEF DESCRIPTION OF THE DRAWINGS

Further features and advantages will become apparent from the following description of preferred embodiments, given by way of example only, which is made with reference to the accompanying drawings in which like reference numerals are used to denote like features and wherein.

DETAILED DESCRIPTION OF CERTAIN INVENTIVE EMBODIMENTS

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Certain examples described herein provide a method and apparatus for generating output image data from input image data representing an input frame of a video, wherein a geometric distortion in at least part of the input frame has been adjusted in the output image data. Examples described herein may include streaming input image data representing a frame of video into temporary storage. Portions of output image data which are to be generated based on corresponding portions of input image data may be generated while the corresponding portions of input image data are stored in the temporary storage. Once the corresponding portions of output image data have been generated, the input image data may be removed from the temporary storage, for example by being overwritten by a different part of the input image data which is being streamed into the temporary storage.

In this way, the input image data comprising a geometric distortion in at least part of the frame represented by the input image data may be streamed into temporary storage and processed in a suitable order to generate output image data in which the geometric distortion is adjusted. This may reduce the memory and other hardware resources which are used to process input image data representing input frames comprising geometric distortion as well as increasing the throughput of a corresponding image processing system. Ordering data may be used to determine an order in which the portions of input image data are to be processed to generate corresponding portions of output image data.

Figure 1A:
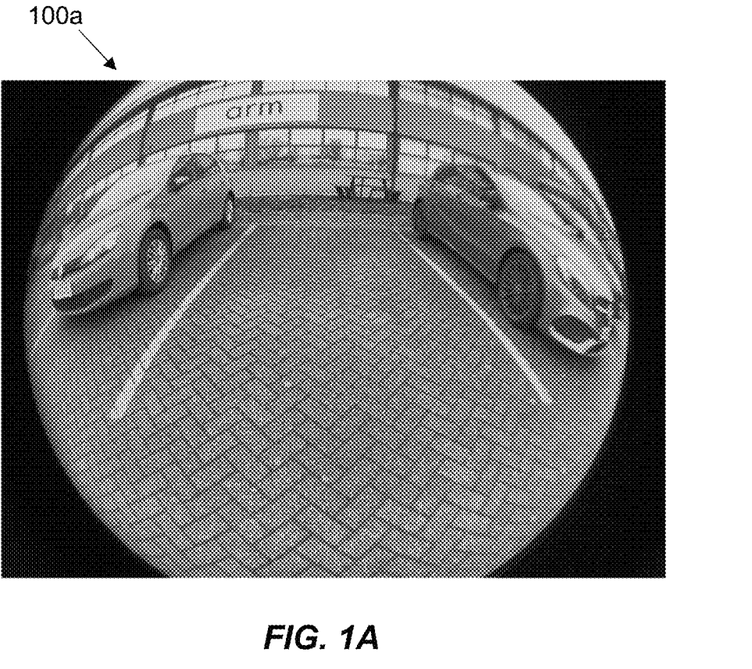
FIGS. 1A and 1B show an image captured using a fisheye lens, and a resultant image following processing of the captured image to adjust a geometric distortion respectively.
Figure 1B:
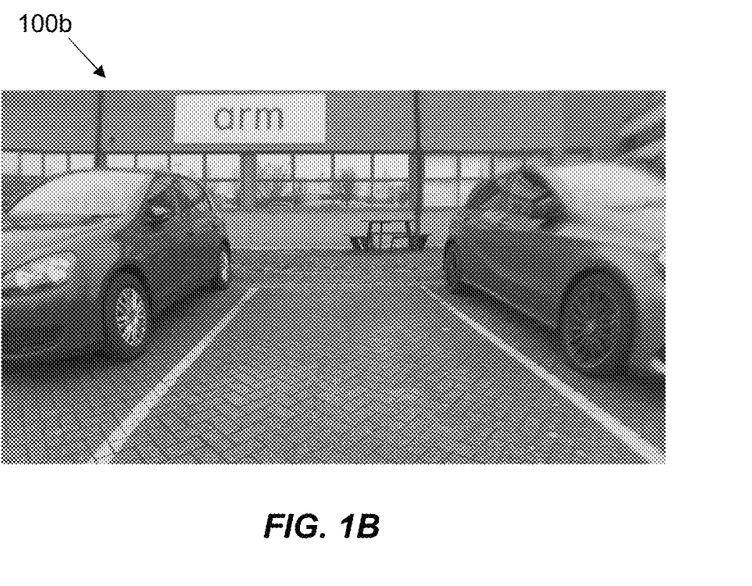

FIG. 1A shows an image 100a captured using a fisheye lens. As can be seen from FIG. 1A, the left and right edges of the image appear curved with respect to the center of the captured image 100a. FIG. 1B shows the same image after a transformation to adjust the geometric distortion caused by the fisheye lens has been applied. In FIG. 1B the left and right edges of the transformed image 100b no longer appear to be curved. In the example shown in FIG. 1A the image 100a which is captured corresponds to a central portion of the field of view of the fisheye lens. In other examples, not shown here, an image which is captured using a fisheye lens may correspond to the entire field of view of the fisheye lens. The captured image 100a in this example is transformed using a panoramic transformation so that the transformed image 100b appears rectilinear in the vertical and horizontal directions. With this transformation, wide view angle images can be generated with reduced artefacts.

In other examples, different transformations may be used, for example a cylindrical projection, or cylindrical transformation, typically allows a spherical image to be mapped to a cylindrical plane and then flattened to a two-dimensional plane. Other examples of transformations may include stereographic projections, equidistant projections, equisolid projections, and orthographic projection.

Stereographic projections may be used, for example, where an image capture device is a dome camera, mounted on the ceiling of a room, having a fisheye lens and is used to capture images of the room from above. The image capture device may capture an image over a field of view of 180 degrees. The image captured from such an image capture device may be divided in two. Each half of the image may be transformed using a stereographic projection to a flat plane to generate two transformed images. In this way, a panoramic view of the scene obtained by the image capture device may be created using the two transformed images. This allows a single camera to be used to capture the scene in the room, instead of a pair of opposed cameras. In other examples more than two transformed images may be used to generate a panoramic view of a scene obtained by the image capture device.

Lenses which can capture images with a large field of view, such as fisheye lenses, may be used for a variety of applications. For example, in security applications where surveillance equipment is used to capture images and videos, fisheye lenses may be used to increase the amount of a scene or room which can be captured without the need to increase the number of cameras or use cameras which have servomechanisms. Using cameras with servomechanisms may allow a single camera to be redirected to view different parts of a room, however, it may not be possible to use such a camera to simultaneously view different regions in the room, or the entire scene. Servomechanisms also provide a further potential point of failure for the camera.

In some examples, it may be desired to process videos captured using fisheye lenses to adjust geometric distortion, quickly. Where video, captured using a fisheye lens, is being streamed to a display device or further processed, it may be desirable to adjust a geometric distortion of the captured images before displaying the video at the display device, or processing the image data further. Fisheye lenses are used in vehicles, such as automobiles, to provide increased field of view for drivers. Some automobiles may have rear facing cameras connected to a display device in the interior of the vehicle to allow an operator of the vehicle to see behind them. Using fisheye lenses in such applications allows the camera which is used to be small whilst providing a large field of view, without needing to rotate.

Cameras may also be used in autonomous vehicles. For example, outward facing cameras mounted on a vehicle may send video data to a computing device. The computing device may process the video data to make determinations regarding the environment in which the autonomous vehicle is operating. The computing device may also receive data from other types of sensors and may use this data, in conjunction with the determinations regarding the environment, to operate the vehicle. Using fisheye lenses may be an efficient way to capture video which represents a large field of view around the vehicle. Spatial information, extracted from the captured video, may be used to determine the cars position in relation to objects in the environment and so the accuracy of the spatial information is important. Consequently, it is desired to process frames of a video to adjust a geometric distortion of at least a part of a frame of the video such that spatial information which is extracted from the video may be used to operate autonomous vehicles. Due to the speeds at which vehicles may travel, it is desirable for cameras used in the operation of autonomous vehicles to have a high frame rate such that the spatial information which is extracted from the video may be temporally accurate. Similarly, it is also desirable for frames of videos captured using fisheye lenses to be processed, to adjust a geometric distortion of at least part of a frame of the video, with a high throughput.

Fisheye lenses may also be used in other devices comprising cameras, such as mobile computing devices like smartphone or tablet devices. In some examples, a mobile computing device comprising a camera may comprise a fisheye lens. However, in other examples a fisheye lens attachment may be attached to, and used in conjunction with, a mobile computing device having a camera with an ordinary lens. Devices comprising fisheye lenses may comprise network connectivity over a local area network (LAN) or a wide area network (WAN). In some cases, a device comprising a fisheye lens may be connected to the Internet of Things. Where a device has network connectivity, the device may be used to stream video captured using the device instantaneously over a network. Alternatively, the device may store captured video and may send the video over the network at a later time.

Figure 2:
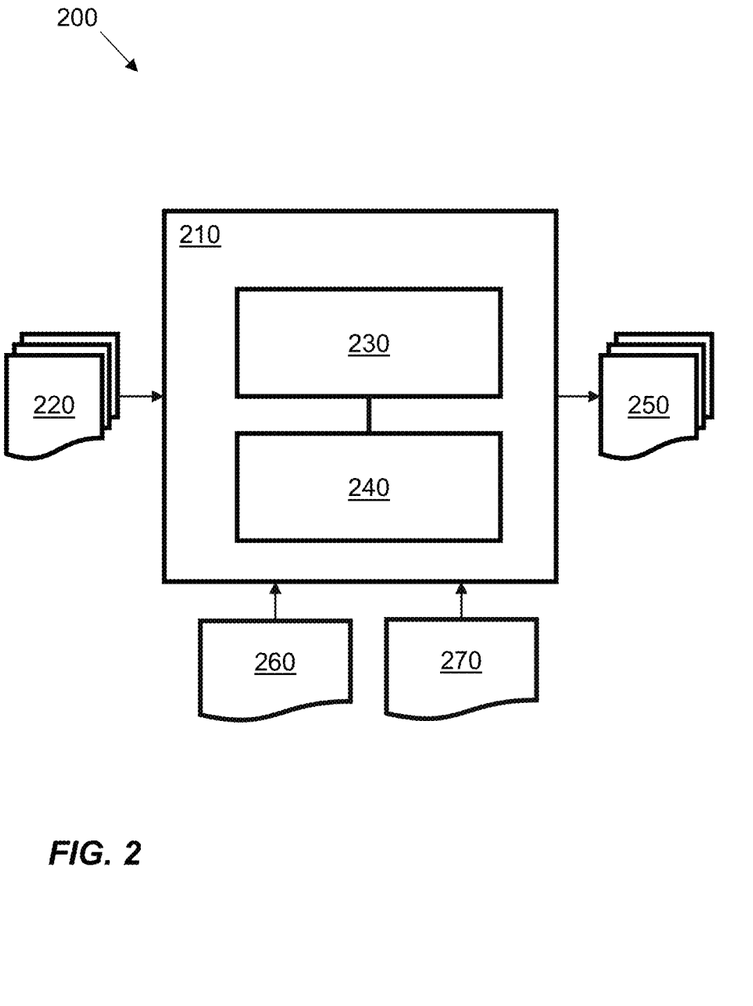
FIG. 2 is a schematic diagram illustrating apparatus according to an example.

An example of internal components of a system 200 in which transformations such as those described with respect to FIGS. 1A and 1B may be applied is shown schematically in FIG. 2. The system 200 of FIG. 2 includes image processing apparatus 210. The image processing apparatus 210 may be a fixed function or system-on-chip device configured to perform the functions described herein. The image processing apparatus 210 may be communicatively coupled to an image capture device, for example via an image capture device interface. The image capture device interface may include software and/or hardware components. In some examples, the image processing apparatus 210 and an image capture device may be integrated in one device. In the following description, reference will be made to the image processing apparatus 210 being "configured" to perform certain functions or operations. In cases where the image processing apparatus 210 is fixed function hardware, being "configured" may mean that the image processing apparatus 210 has been custom made to perform the functions described, or the image processing apparatus 210 may be pre-programmed to perform such functions. In other implementations, the image processing apparatus 210 may comprise one or more non-transitory computer-readable storage mediums. The one or more storage mediums may comprise computer readable instructions which, when executed by at least one processor in the image processing apparatus 210, cause the image processing apparatus 210 to perform the functions described herein. The computer-readable instructions may be in any suitable format or language, for example in machine code, an assembly language, or a hardware description language (HDL) such as Verilog or VHDL, or using high level synthesis in which an algorithmic description in a high level language such as C++ is given and can be translated to an application specific integrated circuit (ASIC) netlist.

The image processing apparatus may receive input image data 220 from an image capture device, for example, via an image capture device interface. The input image data 220 may represent an input frame of a video. The input image data 220 may comprise pixel data representing a plurality of pixel locations in the input frame. For example, the input image data 220 may comprise, for each pixel location, pixel intensity values corresponding to different color channels. The color channels may correspond to red, green, and blue color channels. Other color channels may include a channel representing an intensity or brightness of the corresponding pixel locations. The image capture device may be any suitable device for capturing images, such as a camera or a video camera. The image may be a still image, such as a frame of a video, or a moving image, such as a video. The image capture device may be arranged to capture images over a wide field, or angle, of view, for example by including a wide-angle lens. For a 35 millimeter (mm) film format, wide-angle fisheye lenses may have a typical focal length of between 8 mm and 10 mm for circular images or between 15 mm and 16 mm for full-frame images, to give an angle of view of between 100 degrees and 180 degrees or even larger than 180 degrees, for example 190 degrees.

The calculations used to perform transformations from images captured using a fisheye lens may differ depending on the type of lens which is being used including the focal length and curvature of the lens. Examples of formula expressing the relations between the focal length of the lens "f", the radial position of a point on the image or film sensor "R", and the angle in rads between a point in the real world and the optical axis, which goes from the center of the image through the center of the lens "θ", are given in the table below for different types of fisheye lens transformations.

| Projection | Formula |
| --- | --- |
| Equidistant | $R = f\theta$ |
| Stereographic | $R = 2f\,\text{Tan}(\theta/2)$ |
| Orthographic | $R = f\,\text{Sin}(\theta)$ |
| Equisolid | $R = 2f\,\text{Sin}(\theta/2)$ |

The image processing apparatus 210 includes temporary storage 230. The temporary storage 230 of the image processing apparatus 210 in the example of FIG. 2 is used to store input image data representing an input frame of a video. The temporary storage 230 may also store other data in addition. The temporary storage 230 may include at least one of volatile memory such as Random-Access Memory (RAM), for example Static RAM (SRAM) or Dynamic RAM (DRAM), and non-volatile memory, such as Read Only Memory (ROM) or a solid-state drive (SSD) such as flash memory. The temporary storage 230 may have a fixed capacity and, as data is being stored in the temporary storage 230, data which was previously stored in the temporary storage 230 may be removed from the temporary storage 230 to make space for the data which currently being stored.

The image processing apparatus comprises at least one processor 240. The at least one processor 240 in the example of FIG. 2 may include a microprocessor, a general-purpose processor, a digital signal processor (DSP), an ASIC, a field programmable gate array (FPGA) or other programmable logic device, a discrete gate or transistor logic, discrete hardware components, or any suitable combination thereof designed to perform the functions described herein. The processor 240 may be or include a graphics processing unit (GPU). A processor may also be implemented as a combination of computing devices, e.g., a combination of a DSP and a microprocessor, a plurality of microprocessors, one or more microprocessors in conjunction with a DSP core, or any other such configuration.

The image processing apparatus 210 may be configured to process input image data 220 representing a frame of a video to generate output image data 250 representing an output frame. The image processing apparatus 210 may be configured to stream input image data 220, representing an input frame of a video, into the temporary storage 230. The temporary storage 230 may be storage of a fixed capacity into which input image data 220 may be streamed. Once the temporary storage 230 becomes full, the temporary storage 230 may overwrite previously stored input image data 220 according to a first in first out (FIFO) protocol. For example, input image data 220 may be streamed into the temporary storage 230 in parts, for example as blocks of data, wherein each block represents a horizontal portion of the input frame.

In some cases, the input frame may be comprised of several hundred horizontal portions. Each portion may have a height corresponding to one pixel, or in some cases each portion may have a height corresponding to more than one pixel in the input frame. The input image data representing the input frame may be larger than the capacity of the temporary storage. For instance, input image data representing an input frame may be 1 megabyte whereas the temporary storage 230 may have a capacity in the order of kilobytes and so may not be able to store all of the input image data representing the input frame at once. In some examples, the temporary storage 230 may be able to store less than a hundred parts of input image data. Consequently, once the temporary storage is full, subsequent parts of input image data, representing respective portions in the input frame, may be stored in the temporary storage 230 by removing an oldest part of input image data which was previously stored in the temporary storage 230.

Streaming input image data 220 into the temporary storage 230 in this way may prevent all of the input image data representing the input frame from being accessible at the same time to be processed by the image processing apparatus 210. However, storing the input image data in this way may reduce the amount of memory which is required in the image processing apparatus 210. Further, processing portions of input image data in an ordered manner when instructed may reduce the computing power which would otherwise be spent performing more complex memory access procedures. However, due to the geometric distortion of an input frame captured using an image capture device having a lens with a wide field of view, the order in which portions of output image data 250 are produced may differ to the order in which portions of input image data 220 are streamed into the temporary memory 230. Consequently, the image processing apparatus 210 uses ordering data 260 to determine the order in which portions of output image data are to be generated.

The image processing apparatus 210 may be configured to obtain ordering data 260 indicating a variable order in which portions of output image data are to be generated. The ordering data 260 may be based on at least one characteristic of the input frame. Portions of output data represent respective pixel locations in the output frame of image data. In some examples, portions of output image data may be stored as a plurality of tiles. Each tile may comprise a plurality of portions of output image data representing a respective plurality of output locations. The output locations may also be referred to as pixel locations in the output frame. In some examples, the ordering data may indicate an order in which tiles of the plurality of tiles are to be generated.

Transformation data 270 representing at least one transformation for application to the input image data to adjust a geometric distortion of the input frame may also be obtained. Obtaining transformation data 270 may comprise receiving the transformation data 270, for example, from a computing device communicatively couple to the apparatus. In some examples, the transformation data 270 may be obtained from a device comprising the apparatus such as a smartphone or other computing device comprising the apparatus and further hardware, for example at least one processor and at least one memory. In some examples, the transformation data may be generated by the apparatus 200. The at least one transformation may include at least one of, a panoramic transformation, a stereographic projection, an equidistant projection, an equisolid projection, a cylindrical projection, or an orthographic projection. The type of transformation which is performed may be dependent on the type of fisheye lens which is used. The type of transformation which is used may also depend on a desired geometric distortion in the output frame.

Figure 3A:
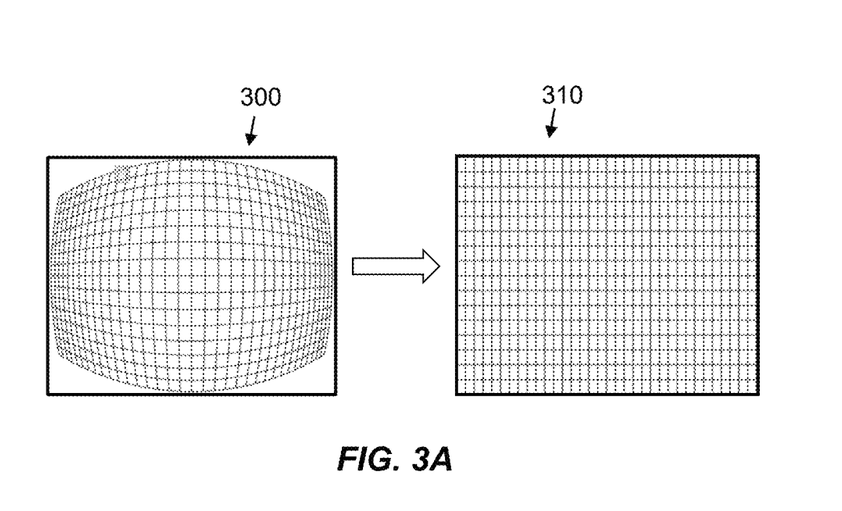
FIG. 3A is a schematic diagram illustrating a geometric distortion adjustment according to an example.

FIG. 3A shows schematically an adjustment of a geometric distortion in a captured image 300 to generate a transformed image, which may also be referred to as an output frame 310. The illustration of the input frame 300, which may also be referred to as a captured image, in FIG. 3A shows gridlines which highlight the geometric distortion of straight features in a scene captured by the input frame 300. The geometric distortion shown in the frame 300 may result from capturing the frame 300 using an image capture device comprising a lens designed to produce an image with a wide field of view, for example a fisheye lens. As can be seen in FIG. 3A, some parts of the input frame 300 do not display any part of the scene. These are shown as white space in the corners of the input frame 300 and result from the geometric distortion. After the transformation, the scene which was captured by the image capture device may fill the full output frame 310.

Figure 3B:
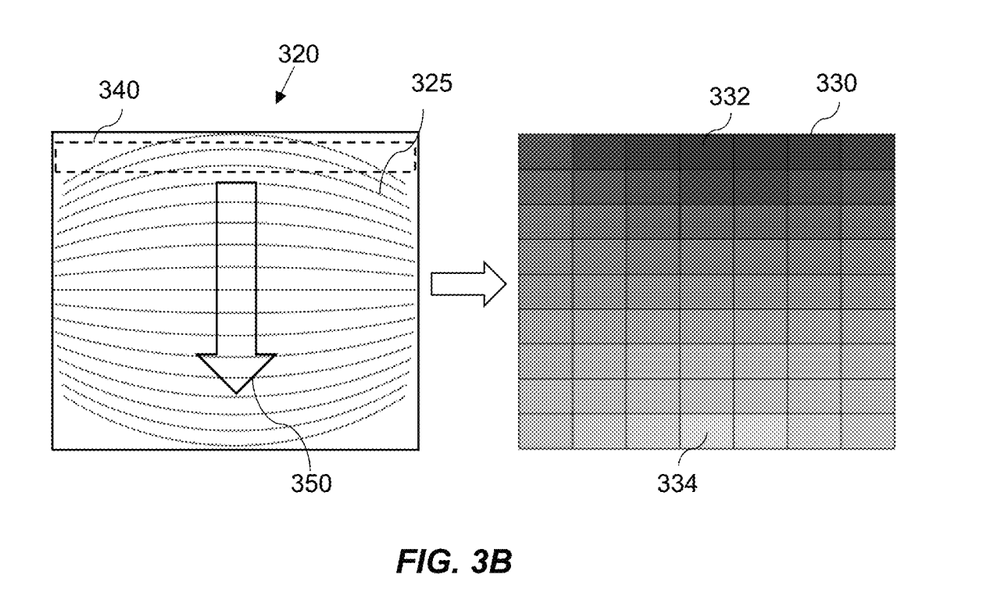
FIG. 3B is a schematic diagram illustrating streaming of input data according to an example.

FIG. 3B shows schematically an example of an order of processing input image data representing an input frame 320 of a video to produce output image data representing an output frame 330. An input frame 320 is shown in which lines 325 represent a geometric distortion of a scene captured in the input frame 320. Input image data representing the input frame 320 may be streamed in parts into temporary storage. This may be performed by sequentially storing blocks of data representing adjacent rows or columns of pixels in the input frame. In the example shown in FIG. 3B, this is shown by the box 340 represented in broken lines. The box 340 represents the amount of the input frame 320 which may be stored in the temporary storage at one time. The arrow 350 is used to show that the part of the input frame 320 which is stored in the temporary storage changes over time as image data representing horizontal rows of pixels below the box 340 are stored in the temporary storage and image data representing horizontal rows of pixels above the box 340 are removed from the temporary storage. The output frame 330 is shown as a heatmap representing an order in which parts of the output frame are able to be generated based on a characteristic of the input frame. In the example shown in FIG. 3B, the output frame 300 is shown as being separated into tiles. The darkest tile 332 in the output frame 330 represents the first tile of output image data which can be generated. The lightest tile 334 in the output frame 330 represents the last tile of output image which can be generated. The shape and size of the tiles in the output frame 330 is exemplary and the actual shape and size of the tiles which may be variable and/or predetermined.

The order in which output image data is to be generated may also be dependent on the order in which corresponding portions of input image data are stored in the temporary storage and a capacity of the temporary storage. If there were no geometric distortion in the input frame 320, then, using a streaming process as described above, the order in which output portions of data may be generated when processing the input image data may follow the order in which the input data is streamed into the temporary storage. In other words, there would be no preference in order in which portions of output data representing portions of the output frame 330, in a common row, may be generated.

Where the portions of output image data are stored as a plurality of tiles, the variable order indicated by the ordering data may be dependent on a size of at least one tile of the plurality of tiles. The size of a tile may be defined by a number of pixel locations comprised in the tile including the number of pixel locations in the vertical direction and the horizontal direction. The size of the tiles may be constrained due to the hardware of the apparatus, for example, the capacity of the temporary storage and hence the amount of pixel data which can be stored therein. In some examples, once pixel data has been stored in, and subsequently removed from the temporary storage, the same pixel data may not be re-stored in the temporary storage. In some examples, the size of at least one tile of the plurality of tiles may be determined based on at least a capacity of the temporary storage. The size of the at least one tile of the plurality of tiles may be based on one or more characteristics of the input frame.

Characteristics of the input frame may include an orientation of at least part of the input frame, a type of geometric distortion in at least part of the input frame, and a degree of geometric distortion in at least part of the input frame. The characteristics of the input frame, described above, may affect the number of vertical pixel locations in the input frame which need to be used to generate a given tile in the output frame.

Due to the limited capacity of the temporary storage and the method of streaming input image data into the temporary storage, the size of the tiles in the output frame may be constrained based on to one or more of the characteristics of the input frame. For example, where the input frame has a large amount of geometric distortion (e.g. where a pixel location in a top row of the output frame corresponds to an input location in the input frame which is considerably below the top row of the input frame) an output tile which has a large horizontal size may require a larger amount of input image pixel data to be stored in the temporary storage at one time than examples where there is less geometric distortion. In some examples, a tile may be an 8×1 tile comprising 8 output pixel locations in the horizontal direction and 1 output pixel location in the vertical direction. Other possible examples of tile sizes include 8×8, 16×1, 16×2, 16×4, or other suitable tile sizes.

The ordering data may comprise a plurality of co-ordinates associated with the output frame, which indicate an order in which portions of output image data are to be generated. Alternatively, the ordering data may indicate an order in which portions of output image data are to be generated and a co-ordinate for each and/or a subset of the portions of output image data may be generated by the apparatus. The ordering data may indicate an order in which tiles of the output frame are to be generated rather than explicitly specifying an order for each individual portion of output image data.

In some examples, the ordering data may be generated based on at least one characteristic of the input frame. The order in which output image data may be generated may be dependent on the streaming process and characteristics of the input frame. In some examples, the apparatus is configured to obtain frame characteristic data indicating at least one characteristic of the input frame. The apparatus may then generate ordering data based on at least the frame characteristic data. In other examples, this process may be performed externally to the apparatus and the ordering data may be received by the apparatus. The ordering data may for instance be generated in software.

The ordering data may be generated using a device comprising the apparatus, for example a smartphone comprising the apparatus comprising at least one processor and at least one memory, communicatively coupled and configured to generate the ordering data as described above. In some examples, the input image data may comprise an indication of a characteristic of the input frame. For example, image data captured by a device comprising a fisheye lens may also associate the captured image data with an indicator of a characteristic of the fisheye lens which captured said data, a characteristic of the fisheye lens may include an indicator of the type, make, model, year, and/or any other identifying information which may be used to determine a characteristic of the input frame.

The at least one characteristic of the input frame may include at least one of: a type of geometric distortion in at least part of the input frame, a degree of geometric distortion in at least part of the input frame, and/or an orientation of at least part of the input frame. Due to the nature of the streaming of the input image data, the amount and type of geometric distortion which is present in the input frame will affect the order in which portions of output image can be generated, as can be seen in FIG. 3B.

The image processing apparatus 210 may be configured to, using the transformation data 270, identify portions of input image data to be processed to generate corresponding portions of output image data representing respective output locations in an output frame. The transformation data represents at least one transformation for application to the input image data. The co-ordinates of portions of output image data which are comprised in or derived from the ordering data may be converted using the transformation data to identify corresponding portions of input image data which are to be processed to generate the portions of output image data. In examples, the transformation data may be used to implement a functional mapping from output locations to input locations. The function may be a continuous function that represents a predetermined or desired correction or adjustment to be applied to the input frame to correct or adjust the geometric distortion of the input frame. Alternatively, the function may be discontinuous or empirical.

Calculating a position of the input location in the input frame which corresponds to the output location may comprise performing an interpolation. The interpolation may be based on the position of the output location in the output frame, for example a coordinate. The interpolation may also be based on a function representing a transformation of the at least one transformation. Each output location may correspond to a pixel location in the output frame. Various different interpolation methods may be used to derive the functional mapping. Coefficients to be used for the functional mapping may be determined in software. The software may be implemented externally to the apparatus and the calculated coefficients may be sent to the apparatus. Alternatively, the apparatus may comprise functionality to determine the coefficients. The transformation data, after being obtained, may be stored in storage at the apparatus. In examples, the interpolation is a spline interpolation. In such examples, the output locations may correspond to respective knots of the spline. For example, where the output locations correspond to integer pixel locations, the knots of the spline may also coincide or correspond to integer pixel locations. The knots of the spline may be uniformly spaced in the coordinate system of the output frame, although non-uniform inter-knot spacing is possible in some examples. Using a spline interpolation with integer knot locations for example forces a mapping to be found from output locations, evaluated at integer positions corresponding to the knots of the spline, to input locations, which are generally fractional positions, improving the accuracy of the functional mapping. In contrast, with the function representing the mapping, it may not be possible to precisely map the input locations to integer output locations for at least some of the output locations (corresponding to output pixels). This may therefore lead to rounding errors that may be avoided when using the spline interpolation with integer knots.

A pixel value interpolation may be performed separately for each dimension of the input frame. For example, if the input frame is in a two-dimensional coordinate system, with a horizontal x coordinate and a vertical y coordinate, an interpolation may be performed in the x-direction for a row of pixels of the input tile (which for example corresponds with a fixed or constant y location) and subsequently an interpolation may be performed in the y-direction for a column of pixels of the input tile.

The spline interpolation may be a second order spline interpolation. Such an interpolation may be used to determine the spline coefficients for a sum of spline functions, such as a sum of spline basis functions, including a second order basis function. For example, the spline interpolation may be based on an adjustment of spline coefficients of the spline in dependence on an error between the spline and the function representing the transformation of the at least one transformation. For example, the spline coefficients may be incrementally altered to minimize an error between the spline function and the function representing the transformation. The error is for example a difference between the spline function and the function representing the transformation. As the skilled person will appreciate, the error minimization may use any suitable method, such as gradient descent.

In normalized coordinates, where spline knots are at integer positions in the output frame (in other words, where spline knots coincide with pixel locations in the output frame), a one-dimensional spline may be taken to correspond with a weighted sum of the following hat functions shifted by integer numbers in the coordinate system of the output frame (although other functions are possible in other examples):

$$y = \frac{t^2}{2}, 0 \leq t \leq 1$$

$$y = -\frac{3}{2} + 3t - t^2, 1 \leq t \leq 2$$

$$y = \frac{(3-t)^2}{2}, 2 \leq t \leq 3$$

$$y = 0, t < 0, t > 3$$

A two dimensional b-spline (basis-spline) may be taken to be a product of the above functions in the horizontal and vertical directions.

For interpolation of a one dimensional b-spline, on each interval the resultant function will be a second order polynomial, which can be calculated using an incremental scheme. For example, the first derivative is interpolated as a linear ramp and the function can be taken as the cumulative sum of the first derivative samples. For such an interpolation, the result will depend on three control points because the basis functions have limited support. The slope of the first derivative will be the linear combination of these three points.

These calculations can be done using integer arithmetic without a loss of precision. This allows the same result, in other words the same corresponding input location in the input tile, to be achieved for an output location at the right edge of one output tile and the left edge of the neighboring tile to the left. For example, a rounding error may not be accumulated.

In some cases, knot coefficients may be negative to correspond to input locations that are beyond the extent of an input image capture device, or a sensor of such an image capture device. If, for example, the storage for storing the input locations calculated using the functional mapping is capable of storing 16-bit values, the (x, y) offsets can be added to the calculated (x, y) values so that the knot values fit an unsigned 16-bit integer. The (x, y) offsets are subtracted at the end of the calculations and the result can be stored as an unsigned 16-bit number. The 16-bit (x, y) values in such cases therefore correspond to input locations in the input frame with sub-pixel accuracy, for example with the three least significant bits representing the fractional part of the (x, y) values.

Where the input data is in the YUV 4:2:0 format, the same knot coefficients can be used. However, the knot step or the spacing between neighboring knots may be selected to be half the nominal value to account for down-sampling by a factor of two of the U, V components of the YUV data. The spline sampling grid may also be shifted by a quarter for the Y component.

After identifying portions of input image data which correspond to the portions of output image data based on the coordinates of the portions of output image data and the transformation data, the corresponding pixel value for that input location can be derived. In examples, the pixel value for the input location is based on an interpolation based on the pixel data.

The image processing apparatus 210 may be configured to process the identified portions of input image data to generate corresponding portions of output image data in the order indicated by the ordering data. In some examples, the processing is performed while the identified portions of input image data are stored in the temporary storage 230.

In examples where the input image data comprises pixel data representing a plurality of pixel locations in the input frame. The input image data may comprise, for each pixel location, pixel intensity values corresponding to different color channels. The color channels may correspond to red, green, and blue color channels. Other color channels may include a channel representing an intensity of brightness of the corresponding pixel locations. Identifying which portion of input image data is to be processed to generate a corresponding portion of output image data may comprise, for a given portion of output image data, using at least part of the transformation data to calculate a position of an input location in the input frame which corresponds to an output location to be represented by the said portion of output image data. Pixel data is identified, the pixel data representing a set of pixel locations in the input frame which define a region in the input frame which includes the input location.

Figure 4:
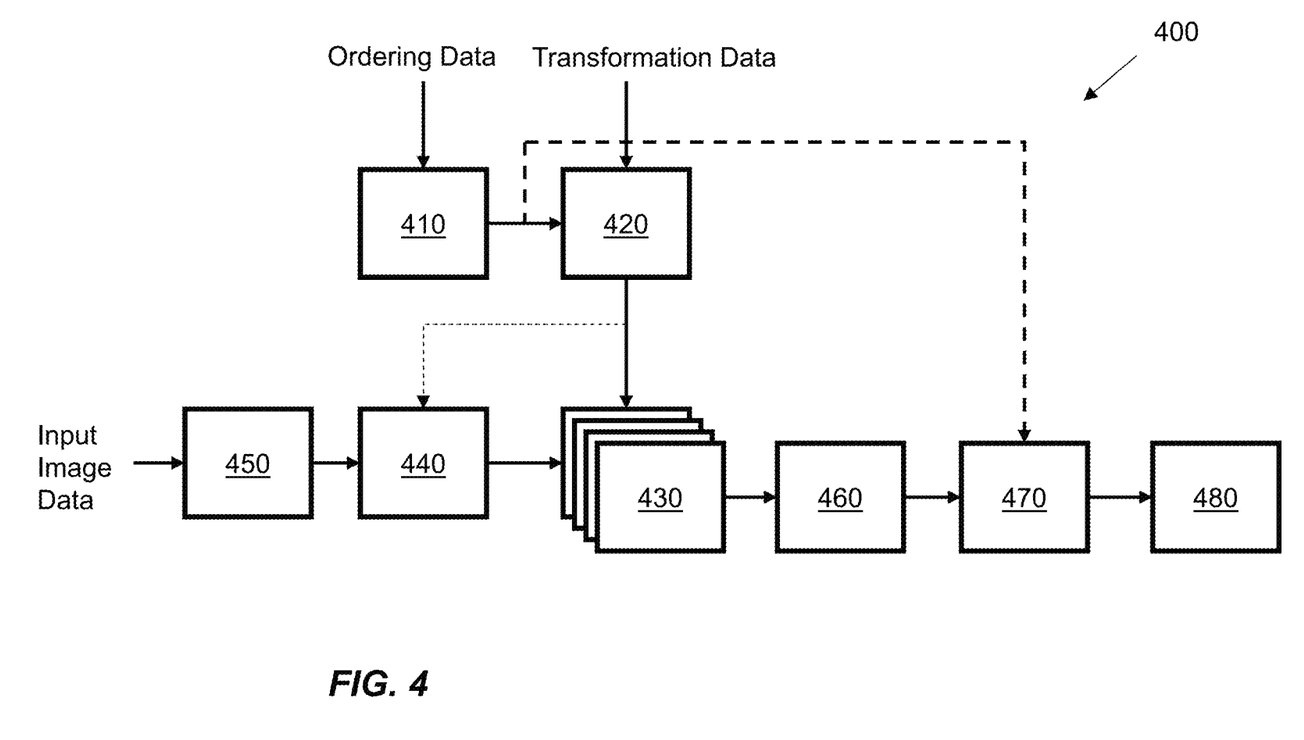
FIG. 4 is a schematic diagram illustrating apparatus according to an example.

FIG. 4 shows schematically an apparatus 400 according to an example. The apparatus comprises a first module 410 for obtaining ordering data. The ordering data may indicate an order in which portions of output image data are to be generated. The ordering data may comprise coordinates associated with locations in the output frame. Alternatively, the ordering data may comprise an indication of an order, and the first module 410 may be used to determine the coordinates of the output frame in order. The first module 410 then forwards the coordinates to the coordinate interpolation module 420 in an order which is indicative of the order in which the output image data is to be generated.

The apparatus 400 comprises a second module 420, communicatively coupled to the first module 410, which obtains the transformation data and uses the transformation data to identify portions of input image data to be processed to generate the corresponding portions of output image data representing respective output locations in the output frame. The coordinates may be received from the first module in an appropriate order and transformed using the transformation data to identify input locations and thereby portions of input image data. The second module 420 may be referred to as a coordinate interpolation module. The coordinate interpolation module may generate requests, in the form of coordinate requests, or tile coordinate requests, indicating an order in which portions of input image data are to be processed.

A third module 430, which may be referred to as a pixel interpolation module, is communicatively coupled to the second module 420 and is used to process the identified portions of image data. In some examples, the third module may comprise a plurality of interpolation modules working on different color channels, for example, four. Each pixel interpolation module may receive either full resolution of a down-sampled resolution of the data generated at the second module 420 as described above. Methods of processing image data in the pixel interpolation module will be described later with reference to FIG. 5.

The output from the second module may also be sent to temporary storage 440. The temporary storage 440 has a streaming input for streaming the input image data. The temporary storage 440 is also communicatively coupled to the pixel interpolation module 430 to provide the input image data to be processed. The output from the temporary storage 440 to the pixel interpolation module(s) 430 may be provided in an order corresponding to requests from the coordinate interpolation module 420. The input image data may be provided to the pixel interpolation module 430 in blocks. For example, the temporary storage 440 may provide pixel data representing a set of pixel locations to the pixel interpolation module 430.

The set of pixel locations may comprise a 4×4 grid of pixel locations in the input frame. The temporary storage 440 may also comprise or be communicatively coupled to a module which monitors the input image data stored in the temporary storage 440 so that requests from the coordinate interpolation module 420 can be processed correctly, and the relevant pixel data forwarded to the pixel interpolation module 430. If input image data which is requested by the coordinate interpolation module is not stored in the temporary storage 440, then requests from the coordinate interpolation module may be stopped or queued in order that the current request may be dealt with. A signal may be sent to the coordinate interpolation module 420 to signal that requests should be stopped. This may prevent requests from being missed and not processed. A signal may similarly be sent to the first module 410 to prevent it from instructing the coordinate interpolation module 420 from generating requests. In some examples, a signal input to the first module 410 may be set at either a high or low value. Depending on the value of the input signal to the first module 410, the first module 410 may forward coordinate data to the coordinate interpolation module 420 or may temporarily stop sending coordinate data to the coordinate interpolation module 420. The process may resume once the relevant data has been stored in the temporary storage 440.

In order to handle image data comprising a plurality of channels, and where there is a plurality of pixel interpolation modules 430 each associated with a channel, the temporary storage 440 may also be able to store input image data as a plurality of channels. In this case, a single request from the coordinate interpolation module 420 may be used to instruct the temporary storage to forward the pixel data representing all available channels to the relevant pixel interpolation modules 430. Alternatively, separate requests may be used for each channel and each channel may be processed independently.

The apparatus 400 also comprises a fourth module 450, which may be referred to as a pre-processing module. The pre-processing module 450 may be used to convert input image data into a linear domain from a tone mapping domain. The pre-processing module 450 may implement a look-up-table such as a linearization look-up-table. Processing linear data may result in higher quality output data and may be simpler to process. The pre-processing module 450 may enable the apparatus 400 to process both linear and non-linear color spaces. The pre-processing module 450 may also support the use of floating-point storage such as single-precision floating-point format or half-precision floating points (FP16).

In some examples, the image data stored in the temporary storage 440 is stored in a different colorspace and/or in a subsampled format in comparison to the input image data which is input and/or the output image data which is generated. For example, the image data stored in the temporary storage 440 may be stored in YUV4:2:0 format and the output image data may be in YUV4:2:2 to reduce the size of the temporary storage 440 which is used. Alternatively, image data may be stored in the temporary storage 440 in YUV 4:2:0 format and then an interpolation to produce YUV 4:4:4 format and a conversion to RGB may be performed before storing the result as output image data. Other schemes include storing image data in the temporary storage 440 in FP16 format and outputting image data as 20 bit format in a linear domain.

A fifth module is provided 460, which may be referred to as an output formatter. The output formatter 460 may perform the inverse operation of the pre-processing module 450 such that the image data which is output from the apparatus may be in the same format as the input image data. The output formatter may also implement other functions, for example, the output formatter 460 may perform gamma compression and/or may perform recombination of the separate color channels, such that the output image data is in an appropriate format to be stored for later use or for further processing. The output formatter 460 may also produce image data which is in a different format and/or represents a different colorspace to the input image data and/or the image data stored in the temporary storage 440.

The apparatus may comprise a tile cache 470. As described above, the portions of output image data may be stored in tiles. As portions of output image data are generated they may be stored in the tile cache 470, once a full tile has been generated and stored in the tile cache 470, the output image data representing the tile may be output from the apparatus, for example may be stored and/or further processed. The tile cache 470 may also be referred to as a tile first in first out (FIFO) module. The tile cache 470 may also receive coordinate data from the first module 410. For example, where the first module 410 generates one or more coordinates corresponding to a tile which is to be output, the one or more coordinates may be sent to the tile cache 470. Once the output image data representing that tile has been received at the tile cache 470, the tile cache may forward the pixel data corresponding to the tile with the relevant coordinate which identifies that tile to be stored or further processed. In this way the apparatus 400 may store or forward output image data in tiles which are associated with an indication of their relative position in the output frame. In the example shown in FIG. 4, the apparatus 400 comprises a direct memory access writer 480 for writing output image data representing a tile to storage.

Figure 5:
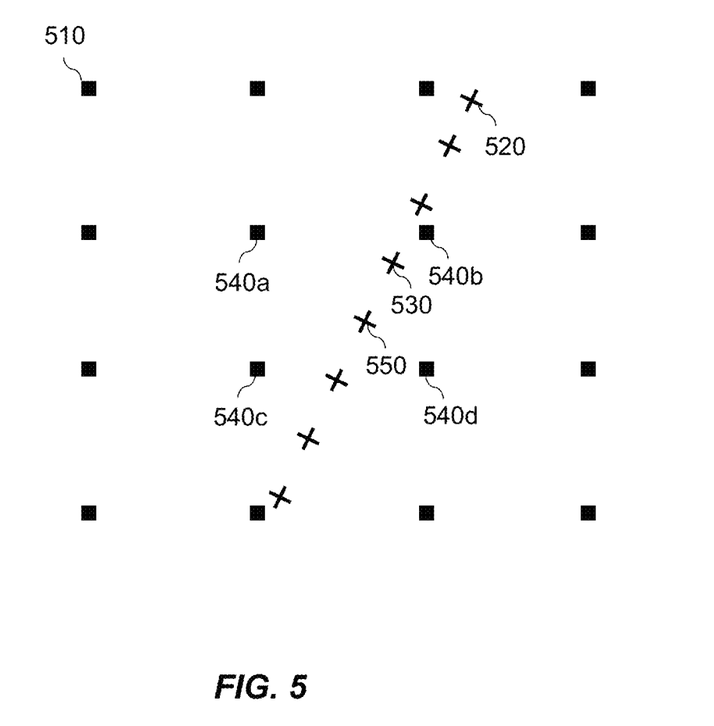
FIG. 5 is a schematic diagram illustrating the relative positions of input pixel locations and input locations corresponding to output pixel locations.

FIG. 5 shows schematically input pixel locations representing a portion of the input frame, the pixel locations being shown as squares in FIG. 5. For example, square 510 represents a pixel location which is represented by at least one pixel value in the input image data. FIG. 5 also shows a plurality of input locations, represented as crosses, such as cross 520. The input locations shown using crosses in FIG. 5 correspond to output pixel locations in the output frame. The locations of the input locations are determined using the transformation data, for example, in the coordinate interpolation module. As can be seen in FIG. 5, there may not be pixel location/pixel value for each input location. In some instances, the pixel locations shown using squares and the input locations which correspond to output pixel locations will overlap, however, this is not usually the case. Consequently, identified portions of input image data may be processed, for example, using interpolation, to generate corresponding portions of output data. In an implementation, at least one identified portion of input image data comprises pixel data representing a plurality of pixel locations in the input frame and generating a corresponding portion of output image data comprises calculating at least one output pixel value representing a respective output location in the output frame using the pixel data. For example, where the input locations, which correspond to output locations, lie in between input pixel locations, a plurality of pixel values representing surrounding input pixel locations may be used to generate the corresponding portion of output image data representing the output pixel location. In an example, a portion of output image data representing a first output location is to be generated. The output location is mapped to an input location 530. In this case pixel values representing pixel locations 540a-540d may be used to generate the portion of output image data representing the first output location. In other examples, the block of pixels which is identified may be any suitable size, although typically, for bicubic interpolation, the block of input pixel locations is four by four pixels.

Pixel data representing pixel values for input pixel locations of the block of input pixel locations is obtained, for example from the temporary storage 440. The pixel data may be for a subset of the input pixel locations of the block of input locations rather than for each input location. For example, the pixel data stored in the temporary storage 440 may include data representing pixel values of a subset of the pixels of the block of input pixel locations shown in FIG. 5, to reduce storage and processing requirements. For example, if the input frame includes 2 million input pixel locations (or pixels), pixel data representing 16000 input locations of the 2 million input pixel locations may be streamed into the temporary storage 440.

Calculating the at least one output pixel value representing the respective output location may include interpolating based on the pixel data. Using the pixel data, an interpolation can be performed to calculate a pixel value for the input location 530. The pixel value for the input location 530 is then associated with the output location in the output frame.

In an example, the interpolation is a bicubic interpolation. For example, the interpolation may use at least one polyphase filter, for example a bank of polyphase filters. The at least one polyphase filter may depend on the input location. For example, the coefficients of the at least one polyphase filter may differ depending on the input location. For example, each column of the block of input pixel locations may be filtered with a four tap polyphase filter, with tap coefficients that depend on the fractional part of the y-coordinate of the input location. The results may then be filtered using a four tap polyphase filter with tap coefficients that depend on the x-coordinate of the input location. Where bicubic interpolation is used a corresponding bicubic filter will use 16 input samples representing a 4×4 grid to calculate one output sample.

For example, the at least one polyphase filter may depend on a scale factor representing at least one difference in scale between the output frame and the input frame. For example, due to the geometric distortion of the input frame, the input frame may be compressed compared with the output frame. The input frame may therefore be downscaled compared with the output frame. The difference in scale between the output frame and the input frame may be different for different regions of the output and input frame. In some examples the scale difference may be different for different output tiles of the output frame. Local scale factors can be calculated for the input frame, for example based on the derivatives of the functional mapping, and the coefficients of the at least one polyphase filter may then depend on the calculated scale factors. A different set of coefficients may be determined for each portion of the input frame corresponding to a respective tile in the output frame. In other examples, though, the coefficients may differ for each individual pixel, based on a scale factor calculated on a per-pixel basis for example. The filter coefficients for the polyphase filtering may be received by the apparatus, for example, at the pixel interpolation module 430. In other examples, the filter coefficients may be generated in the apparatus 400.

In some examples, there may be two input locations that lie within the same block of input pixel locations. FIG. 5 shows such an example. In FIG. 5, the input location 530 is a first input location, the output location is a first output location, and the pixel value to be calculated is a first pixel value. In FIG. 5, the method also includes determining a second input location 550 corresponding with a second output location. For example, the second input location 550 may be calculated using the functional mapping described above. In the example of FIG. 5, a second pixel value is calculated for the second location 550 based on the pixel data and the second pixel value is associated with the second output location in the output frame. In this way, it is not necessary to re-obtain or re-read the pixel data corresponding to the block of input pixel locations. Instead, the pixel data can be re-used for both input locations 530, 550 and a similar process can be used to obtain the pixel values for each. For example, the same polyphase filters may be used for each, but with different coefficients. Alternatively, different polyphase filters may be used for each. For example, the polyphase filter or polyphase filters to be used may be selected based on the scale factor described above, for example to reduce or prevent aliasing. The fractional coordinate associated with the input locations 530, 550 may determine which phase to use for the polyphase filter(s). For example, if the scale factor is calculated separately for each portion of the input frame representing a corresponding tile in the output frame, the scale factor for the input locations 530, 550 will be the same (as the input locations 530, 550 are both within the same region of the input frame corresponding to the same output tile). However, in the example of FIG. 5, the fractional coordinate is different for the input locations 530, 550. Thus, in this example, the same polyphase filter may be used for the interpolation of the pixel value for each of the input locations 530, 550 but with different phases. Conversely, for different color channels of the same input location, the same polyphase filter and phase may be used to interpolate the pixel value for that color channel. However, as the intensity values associated with each color channel typically differ from those of each other color channel, the calculated pixel value for that color channel will also differ from the calculated pixel value for other color channels for that input location.

Typically, the derivation of coefficients for the interpolations implemented by the coordinate interpolation module 420 and the pixel interpolation module 430 of FIG. 4 may be performed prior to receiving video data, for example using suitable software, as the geometric distortion for example depends on the lens of the image capture device, which may not change between different frames of a video. For example, the coefficients may be obtained using test data and supplied to the apparatus as part of the configuration system. In other examples, though, the apparatus may be used to apply the at least one transformation to the input data and to derive the coefficients for use in the interpolations described above. For example, the transformation data may be time-varying, for example in dependence on a time-varying change in position of the image capture device. For example, it may be possible to alter a pan, tilt or zoom of the image capture device, to capture a different scene. In such cases, it may be desirable to recalculate the coefficients of the interpolations using the data processing system.

Figure 6:
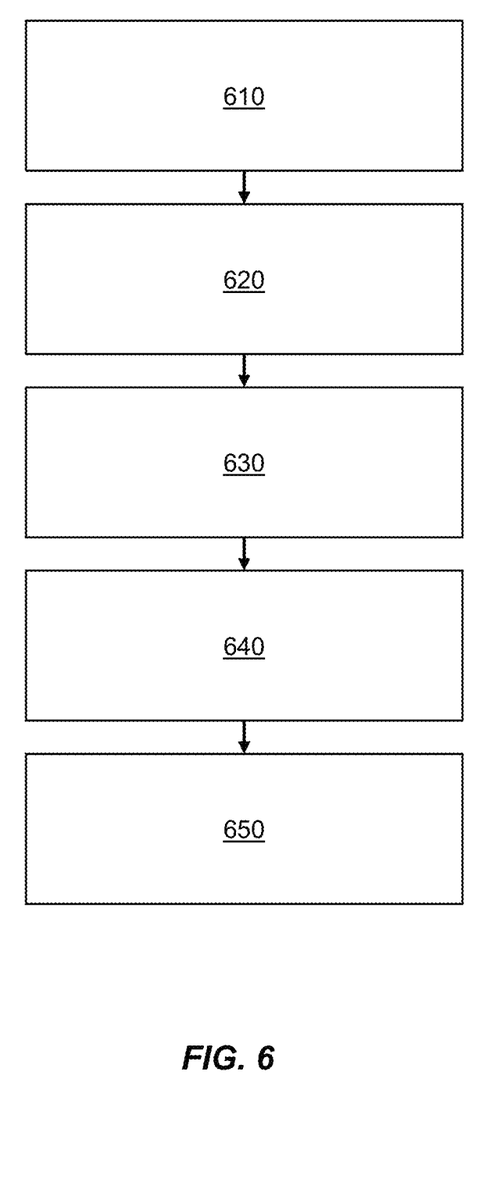
FIG. 6 is a flow chart of a method according to an example.

FIG. 6 shows a flow chart of a method 600 according to an example. At block 610 the method comprises streaming input image data representing an input frame of a video in parts into temporary storage. At block 620, the method 600 comprises obtaining ordering data indicating a variable order in which portions of output image data are to be generated, the ordering data being based on at least one characteristic of the input frame. At block 630, the method 600 comprises obtaining transformation data representing at least one transformation for application to the input image data to adjust a geometric distortion of the input frame. At block 640, the method 600 comprises using the transformation data, identifying portions of input image data to be processed to generate corresponding portions of output image data representing respective output locations in an output frame. At block 650, the method 600 comprises processing the identified portions of input image data to generate the corresponding portions of output image data in the order indicated by the ordering data. In some examples, the processing is performed while the identified portions of input image data are stored in the temporary storage. It is to be understood that the examples described above in relation to the apparatus similarly apply to the method. The method may comprise any processes implemented by the apparatus or associated processes performed in software which affect the process of the apparatus including, for example, generating the transformation data, generating the ordering data, and/or generating any other suitable data, such as the filter coefficients for the pixel interpolation.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method comprising:
   streaming input image data representing an input frame of a video in parts into temporary storage;
   obtaining ordering data indicating an order in which portions of output image data are to be generated, the ordering data being based on at least one characteristic of the input frame that affects a number of vertical pixel locations in the input frame required to generate a given portion of output image data, the at least one characteristic of the input frame including at least one of: a type of geometric distortion in at least part of the input frame, a degree of geometric distortion in at least part of the input frame, or an orientation of at least part of the input frame;

obtaining transformation data representing at least one transformation for application to the input image data to adjust a geometric distortion of the input frame;

using the transformation data, identifying portions of input image data to be processed to generate corresponding portions of output image data representing respective output locations in an output frame; and processing the identified portions of input image data to generate the corresponding portions of output image data in the order indicated by the ordering data.

2. The method of claim 1, wherein the processing is performed while the identified portions of input image data are stored in the temporary storage.

3. The method of claim 1, wherein the input image data representing the input frame is larger than a capacity of the temporary storage.

4. The method of claim 1, wherein the at least one transformation includes at least one of: a panoramic transformation, a stereographic projection, an equidistant projection, an equisolid projection, a cylindrical projection, or an orthographic projection.

5. The method of claim 1, comprising:
obtaining frame characteristic data indicating at least one characteristic of the input frame; and
generating the ordering data based on at least the frame characteristic data.

6. The method of claim 1, wherein the portions of output image data are stored as a plurality of tiles, each tile comprising a plurality of portions of output image data representing a respective plurality of output locations.

7. The method of claim 6, wherein the ordering data indicates a variable order in which tiles of the plurality of tiles are to be generated.

8. The method of claim 7, wherein the variable order indicated by the ordering data is dependent on a size of at least one tile of the plurality of tiles.

9. The method of claim 6, comprising determining the size of at least one tile of the plurality of tiles based on at least a capacity of the temporary storage.

10. The method of claim 7, wherein determining the size of the at least one tile of the plurality of tiles is based on one or more characteristics of the input frame including at least one of: an orientation of at least part of the input frame, a type of geometric distortion in at least part of the input frame, or a degree of geometric distortion in at least part of the input frame.

11. The method of claim 1, wherein the input image data comprises pixel data representing a plurality of pixel locations in the input frame and identifying which portion of input image data is to be processed to generate a corresponding portion of output image data comprises, for a said portion of output image data:
using at least part of the transformation data, calculating a position of an input location in the input frame which corresponds to an output location to be represented by the said portion of output image data; and
identifying pixel data representing a set of pixel locations in the input frame which define a region in the input frame which includes the input location.

12. The method of claim 11, wherein calculating a position of the input location in the input frame which corresponds to the output location comprises performing an interpolation based on:
the position of the output location in the output frame; and
a function representing a transformation of the at least one transformation.

13. The method of claim 12, wherein the interpolation is a spline interpolation.

14. The method of claim 11, wherein the output location corresponds to a pixel location in the output frame.

15. The method of claim 11, wherein at least one identified portion of input image data comprises pixel data representing a plurality of pixel locations in the input frame and generating a corresponding portion of output data comprises calculating at least one output pixel value representing a respective output location in the output frame using the pixel data.

16. The method of claim 15, wherein calculating the at least one output pixel value representing the respective output location comprises interpolating based on the pixel data.

17. The method of claim 16, wherein interpolating based on the pixel data comprises using at least one polyphase filter.

18. Image processing apparatus comprising:
temporary storage for storing input image data representing an input frame of a video; and
at least one processor, wherein
the image processing apparatus is configured to:
stream input image data representing an input frame of a video in parts into the temporary storage;
obtain ordering data indicating an order in which portions of output image data are to be generated, the ordering data being based on at least one characteristic of the input frame that affects a number of vertical pixel locations in the input frame required to generate a given portion of output image data, the at least one characteristic of the input frame including at least one of: a type of geometric distortion in at least part of the input frame, a degree of geometric distortion in at least part of the input frame, or an orientation of at least part of the input frame;
obtain transformation data representing at least one transformation for application to the input image data to adjust a geometric distortion of the input frame;
use the transformation data, identify portions of input image data to be processed to generate corresponding portions of output image data representing respective output locations in an output frame; and
process the identified portions of input image data to generate corresponding portions of output image data in the order indicated by the ordering data.

* * * * *